(12) United States Patent
Zhou et al.

(10) Patent No.: US 11,015,068 B2
(45) Date of Patent: May 25, 2021

(54) COATING LIQUID USED FOR FORMING ULTRAVIOLET ABSORPTION COATING AND ULTRAVIOLET ABSORPTION GLASS

(71) Applicant: FUYAO GLASS INDUSTRY GROUP CO., LTD, Fuzhou (CN)

(72) Inventors: Zhonghua Zhou, Fuzhou (CN); Shanji Guo, Fuzhou (CN); Cheng Ke, Fuzhou (CN); Wenhui Chen, Fuzhou (CN); Bingming Jiang, Fuzhou (CN)

(73) Assignee: FUYAO GLASS INDUSTRY GROUP CO., LTD, Fuzhou (CN)

( * ) Notice: Subject to any disclaimer, the term of this patent is extended or adjusted under 35 U.S.C. 154(b) by 534 days.

(21) Appl. No.: 15/038,282

(22) PCT Filed: Jul. 25, 2014

(86) PCT No.: PCT/CN2014/083016
§ 371 (c)(1),
(2) Date: May 20, 2016

(87) PCT Pub. No.: WO2015/074438
PCT Pub. Date: May 28, 2015

(65) Prior Publication Data
US 2016/0297707 A1    Oct. 13, 2016

(30) Foreign Application Priority Data
Nov. 22, 2013  (CN) .......................... 201310597206.2

(51) Int. Cl.
*C03C 17/00*  (2006.01)
*C09D 5/32*  (2006.01)
(Continued)

(52) U.S. Cl.
CPC .......... *C09D 5/32* (2013.01); *B32B 17/10678* (2013.01); *B32B 27/00* (2013.01);
(Continued)

(58) Field of Classification Search
CPC .......... H04N 1/32037; H04N 1/32048; H04N 1/32053; C03C 17/008; C03C 17/25;
(Continued)

(56) References Cited

U.S. PATENT DOCUMENTS 2,952,575 A  *  9/1960  Baltzer ................. G02B 5/208
                                                        359/359
2011/0299559 A1*  12/2011  Mitamura ........... H01S 5/06804
                                                        372/34
(Continued)

FOREIGN PATENT DOCUMENTS

CN       1474788 A       2/2004
CN       1639279 A       7/2005
(Continued)

OTHER PUBLICATIONS

JP 2013/218631 certified foreign priority document of U.S. 2016/128332, Oct. 21, 2013.*
(Continued)

*Primary Examiner* — Michael B Nelson
(74) *Attorney, Agent, or Firm* — Fish IP Law, LLP

(57) ABSTRACT

Coating liquid used for forming an ultraviolet absorption coating on a surface of an object such as glass and the like, ultraviolet absorption glass arranged with the ultraviolet absorption coating formed by the coating liquid, and a method for preparing the ultraviolet absorption glass. The coating liquid used for forming the ultraviolet absorption coating, the ultraviolet absorption glass and the method for forming the ultraviolet absorption glass, by storing and releasing electrons excited by ultraviolet lights in an ultraviolet absorber, reduce the excited electrons that are gradually accumulated during a process in which the ultraviolet absorber absorbs the ultraviolet lights, thus protecting the ultraviolet absorber and a silicon dioxide matrix, preventing the ultraviolet absorption glass from discoloring or devitri-
(Continued)

fying, ensuring weather resistance of the ultraviolet absorption coating and ensuring color consistency of the ultraviolet absorption glass.

5 Claims, 1 Drawing Sheet

(51) Int. Cl.
  *C09D 183/04* (2006.01)
  *B32B 27/00* (2006.01)
  *B32B 27/28* (2006.01)
  *B32B 17/10* (2006.01)
(52) U.S. Cl.
  CPC ......... *B32B 27/283* (2013.01); *B32B 2383/00* (2013.01); *C09D 183/04* (2013.01); *Y10T 428/31663* (2015.04)
(58) Field of Classification Search
  CPC .............. C03C 1/008; C03C 2217/213; C03C 2217/219; C03C 2217/228; C03C 2217/23; C03C 2217/29; C03C 2217/452; C03C 2217/475; C03C 2217/48; C03C 2217/74; C03C 4/085; C09D 5/32
  See application file for complete search history.

(56) References Cited

U.S. PATENT DOCUMENTS

| | | | | |
|---|---|---|---|---|
| 2012/0189681 | A1* | 7/2012 | Macedo Tavares | A01N 25/28 424/408 |
| 2014/0023860 | A1* | 1/2014 | Kodaira | C03C 17/326 428/336 |
| 2016/0011348 | A1* | 1/2016 | Hirakoso | G02B 5/206 359/359 |
| 2016/0117578 | A1* | 4/2016 | Collins | B42D 25/00 235/488 |

FOREIGN PATENT DOCUMENTS

| | | |
|---|---|---|
| CN | 102341233 A | 2/2012 |
| CN | 102421862 A | 4/2012 |
| JP | S62148339 A | 7/1987 |
| JP | H0372302 A | 3/1991 |
| JP | H0725646 A | 1/1995 |
| JP | 09286954 A | 11/1997 |
| JP | H11209695 A | 8/1999 |
| JP | 2000063754 A | 2/2000 |
| JP | 2000290589 A | 10/2000 |
| JP | 2001089710 A | 4/2001 |
| JP | 2007224173 A | 9/2007 |
| JP | 2007-254722 A | 10/2007 |
| JP | 2008101111 A | 5/2008 |
| JP | 2008143153 A | 6/2008 |
| WO | 2012128332 A1 | 9/2012 |
| WO | WO 2012/128332 * | 12/2012 |

OTHER PUBLICATIONS

Sodium Tungstate NPL document, retrieved Apr. 25, 2019.*
Partial translation of JP 2013/218631, retrieved Mar. 29, 2019.*
Machine translation of JP 2007-254722, retrieved Feb. 5, 2020.*

* cited by examiner

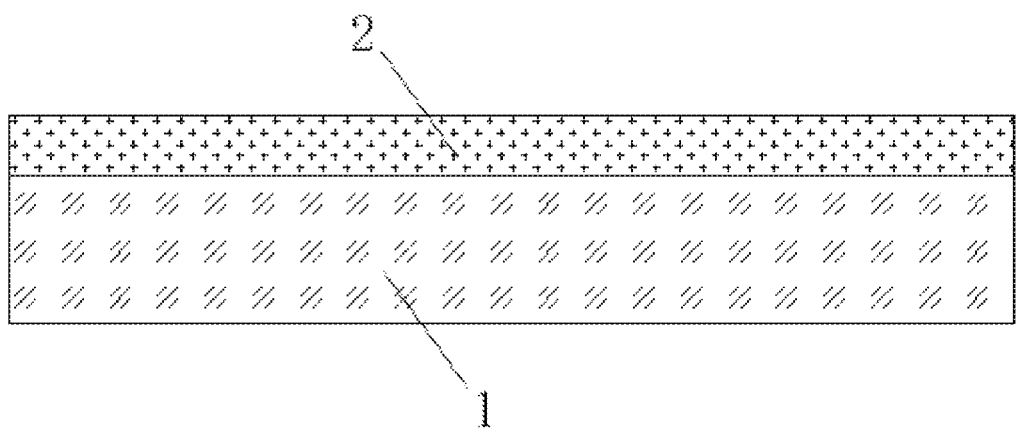

COATING LIQUID USED FOR FORMING ULTRAVIOLET ABSORPTION COATING AND ULTRAVIOLET ABSORPTION GLASS

PRIORITY INFORMATION

The present application claims priority to Chinese Application No. 201310597206.2, entitled Coating Liquid Used for Forming Ultraviolet Absorption Coating and Ultraviolet Absorption Glass, filed on Nov. 22, 2013, the entire contents of which are hereby incorporated by reference.

FIELD OF THE INVENTION

The present invention relates to the technical field of ultraviolet absorption coating, particularly to a coating liquid used for forming an ultraviolet absorption coating on a surface of an object such as glass and the like, and an ultraviolet absorption glass arranged with the ultraviolet absorption coating formed by the coating liquid. Furthermore, a method for preparing the ultraviolet absorption glass is provided.

BACKGROUND OF THE INVENTION

Due to environmental pollution brought by industrial development, atmospheric ozonosphere suffers from more and more serious impact. Moreover, more and more ultraviolet rays in sunlight radiate to ground. As we all know, long-time ultraviolet irradiation harms people's health, such as wrinkles and spots due to skin aging, rough skin or dermatitis and even skin cancer; moreover, it will also result in aging and color fading of automotive trim and house interior decorations in a short time and finally influence people's use. In order to reduce harm of ultraviolet to people's health and influence on people's life, for a long time, people keep on developing automotive glass or building glass which can absorb or reflect ultraviolet rays.

In the prior art, rare earth elements can be added to a glass substrate. Thus, the glass substrate can absorb ultraviolet rays. For example, Chinese Patent CN1089730(C) discloses a green glass composite absorbing infrared and ultraviolet radiation. Cerium dioxide ($CeO_2$) is added to the green glass composite. $CeO_2$ is a strong ultraviolet absorber and basically gives no color to the glass. However, as it is a rare earth element, and is added in the preparing process, the manufacturing cost of glass substrate is enhanced.

Moreover, ultraviolet absorber can be added in the intermediate membrane of laminated glass in order to enable the glass absorbing ultraviolet. For example, Chinese Patent CN103097320 (A) discloses a laminated glass intermediate membrane. An ultraviolet absorber added in the membrane makes the laminated glass able to absorb ultraviolet. However, as at least two glass substrates and one ultraviolet absorbing intermediate membrane are needed, the manufacturing process is complicated, and the cost is relatively high; moreover, as only the intermediate membrane can absorb ultraviolet, it can only be manufactured into laminated glass. Due to high cost, laminated glass is only used as windscreen. Side window glass of vehicles is usually made of single-layer tempered glass. Therefore, application range of this method is small.

Another solution is to apply an ultraviolet absorption coating on surface of a glass substrate to prepare an ultraviolet absorption glass. This method applies to both laminated glass and single-layer glass. For example, Chinese Patent CN102892851(A) discloses a coating liquid for formation of ultraviolet absorption film and an ultraviolet absorption glass product. By applying ultraviolet absorption coating liquid on surface of glass substrate, an ultraviolet absorption film is formed. The coating liquid contains silicon oxide matrix components and ultraviolet absorber. Though the film is able to absorb ultraviolet and has high abrasion resistance and mechanical endurance. However, in practical application, the ultraviolet absorption film is easy to discolor or devitrify, which results in discoloration or devitrification, weak weather resistance, even a yellow appearance of a part of the ultraviolet absorption glass.

Similarly, Chinese Patent CN102421862A discloses a coating liquid for formation of ultraviolet absorption film and an ultraviolet absorption glass product. The coating liquid comprises a combination of the following three components: a component derived from an epoxidized organooxysilane compound (a), a component derived from an organooxysilane compound (b) which is a reaction product of a hydroxylated benzophenone compound and an epoxidized organooxysilane compound, and a component derived from an organooxysilane compound (c) other than the above (a) and (b), wherein each of the above three components is the corresponding organooxysilane compound of the above (a), (b) or (c), or a constituting component of a partially hydrolyzed condensate of at least the corresponding organooxysilane compound of the above (a), (b) or (c). Though the ultraviolet absorption film is capable to absorb ultraviolet and has high abrasion resistance and mechanical endurance, in practical applications, the ultraviolet absorption film is easy to discolor or devitrify, which results in discoloration or devitrification, weak weather resistance, even a yellow appearance of a part of the ultraviolet absorption glass.

SUMMARY OF THE INVENTION

The technical problem to be solved is to overcome the shortages of an existing ultraviolet absorption glass, including high cost, a high tendency towards discoloration or devitrification and poor weather resistance. The present invention provides a coating liquid used for forming ultraviolet absorption coating, and an ultraviolet absorption glass arranged with the ultraviolet absorption coating formed by the coating liquid. Furthermore, a method for preparing the ultraviolet absorption glass is provided.

A technical solution provided in the present invention to solve the technical problem is: a coating liquid used for forming ultraviolet absorption coating, comprising partially hydrolyzed condensates of a silane compound and an ultraviolet absorber, wherein the coating liquid further comprises AxMOy where A is hydrogen or alkali metal, O is oxygen, M is at least one element selected from the group consisting of vanadium, manganese, iron, cobalt, nickel, yttrium, zirconium, niobium, molybdenum, ruthenium, rhodium, palladium, tantalum, tungsten, rhenium, osmium, iridium, gallium, indium, stannum, antimony and bismuth, x is in a range of $1 \le x \le 2$, y is in a range of $1 \le y \le 4$.

Furthermore, the silane compound is at least one compound selected from the group consisting of tetramethoxysilane, tetraethoxysilane, trimethoxysilane, triethoxysilane and dimethoxydimethylsilane.

Furthermore, the coating liquid further comprises deionized water and at least one alcohol.

Furthermore, the alcohol in the coating liquid is ethanol and isopropanol.

Furthermore, the coating liquid further comprises a silane additive.

Furthermore, the silane additive is at least one compound selected from the group consisting of N-[3-(trimethoxysilyl)propyl]ethylenediamine, [3-(methacryloyloxy)propyl]trimethoxysilane, [3-(2-aminoethyl)aminopropyl]trimethoxysilane and [3-(methacryloyloxy)propyl] triethoxysilane.

Furthermore, the $A_xMO_y$ is at least one compound selected from the group consisting of $LiVO_3$, $HMnO_4$, $Na_2FeO_4$, $LiCoO_2$, $LiNiO_2$, $NaYO_2$, $Na_2ZrO_3$, $LiNbO_3$, $Li_2MoO_4$, $H_2RuO_4$, $LiRhO_2$, $Li_2PdO_3$, $LiTaO_3$, $Na_2WO_4$, $H_2ReO_4$, $K_2OsO_4$, $KIrO_3$, $NaGaO_2$, $NaInO_2$, $Na_2SnO_3$, $NaSbO_3$ and $NaBiO_3$.

Furthermore, the ultraviolet absorber is benzophenone ultraviolet absorber, benzimidazole ultraviolet absorber or triazine ultraviolet absorber.

In addition, the present invention further provides an ultraviolet absorption glass comprising a glass substrate and an ultraviolet absorption coating formed by a coating liquid, the ultraviolet absorption coating being arranged on at least one surface of the glass substrate, the ultraviolet absorption coating comprising silicon dioxide and an ultraviolet absorber, wherein the ultraviolet absorption coating further comprises $MO_z$ used for storing and releasing electrons that excited by ultraviolet lights in the ultraviolet absorber, where O is oxygen, M is at least one element selected from the group consisting of vanadium, manganese, iron, cobalt, nickel, yttrium, zirconium, niobium, molybdenum, ruthenium, rhodium, palladium, tantalum, tungsten, rhenium, osmium, iridium, gallium, indium, stannum, antimony and bismuth, z is in a range of $1 \leq z \leq 4$.

Furthermore, the $MO_z$ is at least one compound selected from the group consisting of $VO_{5/2}$, $MnO_2$, $FeO_{3/2}$, $CoO_{4/3}$, $NiO$, $YO_{3/2}$, $ZrO_2$, $NbO_{5/2}$, $MoO_3$, $RuO_2$, $RhO_{3/2}$, $PdO$, $TaO_{5/2}$, $WO_3$, $ReO_3$, $OsO_4$, $IrO_2$, $GaO_{3/2}$, $InO_{3/2}$, $SnO_2$, $SbO_{5/2}$ and $BiO_{5/2}$.

Furthermore, the ultraviolet absorber is benzophenone ultraviolet absorber, benzimidazole ultraviolet absorber or triazine ultraviolet absorber.

Furthermore, in the ultraviolet absorption coating, a molar ratio of $MO_z$ to silicon dioxide is in a range of 1/300-1/100.

Further, in the ultraviolet absorption coating, a molar ratio of $MO_z$ to silicon dioxide is in a range of 1/180-1/120.

Furthermore, in the ultraviolet absorption coating, a molar ratio of $MO_z$ to ultraviolet absorber is in a range of 1/20-1/10.

Further, in the ultraviolet absorption coating, a molar ratio of $MO_z$ to ultraviolet absorber is in a range of 1/18-1/12.

Furthermore, the glass substrate is a white float glass or a green float glass.

Furthermore, a color difference between the ultraviolet absorption glass and the glass substrate is in a range of $\Delta E^*ab \leq 2.0$.

Furthermore, the present invention also provides a method for preparing an ultraviolet absorption glass, comprising the steps of:

step 1: providing silane compound and $A_xMO_y$ as raw material, providing deionized water and at least one alcohol as a solvent, stirring and ultrasonically dispersing the raw material and solvent, wherein A is hydrogen or alkali metal, O is oxygen, M is at least one element selected from the group consisting of vanadium, manganese, iron, cobalt, nickel, yttrium, zirconium, niobium, molybdenum, ruthenium, rhodium, palladium, tantalum, tungsten, rhenium, osmium, iridium, gallium, indium, stannum, antimony and bismuth, x is in a range of $1 \leq x \leq 2$, y is in a range of $1 \leq y \leq 4$;

step 2: after the step of stirring and ultrasonically dispersing, conducting a hydrolysis reaction and a condensation reaction between the raw material and solvent to produce a colloid B containing silicon dioxide in a form of a partially hydrolyzed condensate;

step 3: adding an ultraviolet absorber and a silane additive to the colloid B while stirring to dissolve the ultraviolet absorber, then obtaining a coating liquid C used for forming an ultraviolet absorption coating;

step 4: preparing a glass substrate, applying the coating liquid C uniformly on at least one surface of the glass substrate;

Step 5: drying the coating liquid C at a temperature of 100° C.–200° C. to form an ultraviolet absorption coating containing $MO_z$ on a surface of the glass substrate, O is oxygen, M is at least one element selected from the group consisting of vanadium, manganese, iron, cobalt, nickel, yttrium, zirconium, niobium, molybdenum, ruthenium, rhodium, palladium, tantalum, tungsten, rhenium, osmium, iridium, gallium, indium, stannum, antimony and bismuth, z is in a range of $1 \leq z \leq 4$, thereby obtaining an ultraviolet absorption glass.

Furthermore, the silane compound is at least one compound selected from the group consisting of tetramethoxysilane, tetraethoxysilane, trimethoxysilane, triethoxysilane and dimethoxydimethylsilane.

Furthermore, the alcohol in step 1 is ethanol and isopropanol.

Furthermore, the $A_xMO_y$ in step 1 is at least one compound selected from the group consisting of $LiVO_3$, $HMnO_4$, $Na_2FeO_4$, $LiCoO_2$, $LiNiO_2$, $NaYO_2$, $Na_2ZrO_3$, $LiNbO_3$, $Li_2MoO_4$, $H_2RuO_4$, $LiRhO_2$, $Li_2PdO_3$, $LiTaO_3$, $Na_2WO_4$, $H_2ReO_4$, $K_2OsO_4$, $KIrO_3$, $NaGaO_2$, $NaInO_2$, $Na_2SnO_3$, $NaSbO_3$ and $NaBiO_3$.

Furthermore, the silane additive in step 3 is at least one compound selected from the group consisting of N-[3-(trimethoxysilyl)propyl]ethylenediamine, [3-(methacryloyloxy)propyl] trimethoxysilane, [3-(2-aminoethyl)aminopropyl]trimethoxysilane and [3-(methacryloyloxy)propyl] triethoxysilane.

Furthermore, the $MO_z$ in step 5 is at least one compound selected from the group consisting of $VO_{5/2}$, $MnO_2$, $FeO_{3/2}$, $CoO_{4/3}$, $NiO$, $YO_{3/2}$, $ZrO_2$, $NbO_{5/2}$, $MoO_3$, $RuO_2$, $RhO_{3/2}$, $PdO$, $TaO_{5/2}$, $WO_3$, $ReO_3$, $OsO_4$, $IrO_2$, $GaO_{3/2}$, $InO_{3/2}$, $SnO_2$, $SbO_{5/2}$ and $BiO_{5/2}$.

Furthermore, the step of drying the coating liquid C in step 5 is conducted for 30 to 120 minutes.

Furthermore, the ultraviolet absorber is benzophenone ultraviolet absorber, benzimidazole ultraviolet absorber or triazine ultraviolet absorber.

With the above technical solutions, the present invention has beneficial effects as described below.

The present invention provides a coating liquid used for forming the ultraviolet absorption coating, an ultraviolet absorption glass and a method for preparing the ultraviolet absorption glass. By storing and releasing electrons excited by ultraviolet lights in an ultraviolet absorber, the present invention reduces the excited electrons that are gradually accumulated during a process in which the ultraviolet absorber absorbs the ultraviolet lights, thus protecting the ultraviolet absorber and a silicon dioxide matrix, preventing the ultraviolet absorption glass from discoloring or devitrifying, ensuring weather resistance of the ultraviolet absorption coating and ensuring color consistency of the ultraviolet absorption glass.

BRIEF DESCRIPTION OF THE DRAWINGS

FIG. 1 shows an ultraviolet absorption glass of the present invention, where element 1 is a glass substrate, and element 2 is an ultraviolet absorption coating.

DETAILED DESCRIPTION OF ILLUSTRATED EMBODIMENTS

Further description of the present invention will be illustrated, which combined with embodiments in the drawings.

The coating liquid used for forming ultraviolet absorption coating of the present invention comprises partially hydrolyzed condensates of a silane compound and an ultraviolet absorber. The partially hydrolyzed condensates of a silane compound contain silicon dioxide, which can be used for improving hardness and adhesion to the glass substrate of the ultraviolet absorption coating which is formed by the coating liquid, thereby ensuring high durability of the ultraviolet absorption coating. An ultraviolet absorber absorbs ultraviolet (UV) light and blocks the UV light coming into the vehicle or the house, avoiding damage to human health and aging of the decoration.

The term "partially hydrolyzed condensates" refers to oligomers (polymers) generated by hydrolysis and dehydration-condensation of an organic silane compound, which is generally polymerizing and dissolved in a solvent to an extent. The partially hydrolyzed condensates containing organic oxy group or silanol group are able to hydrolysis and condensate further to give final substance. The silane compound is at least one compound selected from the group consisting of tetramethoxysilane, tetraethoxysilane, trimethoxysilane, triethoxysilane and dimethoxydimethylsilane. In general, a single silane compound produces partially hydrolyzed condensates, while two or more silane compounds produce partial hydrolyzed co-condensates as their co-condensates. They are collectively referred to as "partially hydrolyzed condensate" in the present invention.

It is well known in the prior art that an ultraviolet absorption glass containing a surface coating of silicon dioxide ($SiO_2$) and ultraviolet absorber absorbs the ultraviolet light. However, after being used for a period of time, the surface coating tends to become discolored or devitrified, resulting in discoloration or devitrification of the ultraviolet absorption glass, even a yellow appearance of a part of the glass. After absorbing the ultraviolet light, outer electrons of the ultraviolet absorber molecule jump from the ground state to an excited state (anti-bonding orbital), being raised to an excited state. The excited electrons can not be transferred. When the excited electrons accumulate and reach the capacity of ultraviolet absorber molecule, ultraviolet absorber or silicon dioxide will be destroyed, leading to discoloration or devitrification and a yellow appearance of the glass. Actually, such ultraviolet absorption glass has poor weather resistance in practical use. Therefore, the coating liquid used for forming ultraviolet absorption coating of the present invention further comprises $A_xMO_y$, where A is hydrogen or alkali metal, O is oxygen, M is at least one element selected from the group consisting of vanadium (V), manganese (Mn), iron (Fe), cobalt (Co), nickel (Ni), yttrium (Y), zirconium (Zr), niobium (Nb), molybdenum (Mo), ruthenium (Ru), rhodium (Rh), palladium (Pd), tantalum (Ta), tungsten (W), rhenium (Re), osmium (Os), iridium (Ir), gallium (Ga), indium (In), stannum (Sn), antimony (Sb) and bismuth (Bi), x is in a range of $1 \leq x \leq 2$, y is in a range of $1 \leq y \leq 4$. The $MO_z$ is used for storing and releasing electrons that excited by ultraviolet lights in the ultraviolet absorber.

Further, the coating liquid used for forming ultraviolet absorption coating further comprises deionized water and at least one of alcohol as solvent. Preferably, the alcohol in the coating liquid is ethanol and isopropanol, since both of the two alcohols are capable of dissolving the ultraviolet absorber and have a lower boiling point.

In addition, the coating liquid used for forming ultraviolet absorption coating further comprises a silane additive which is capable of improving adhesion of the coating liquid to the glass substrate. The silane additive is at least one compound selected from the group consisting of N-[3-(trimethoxysilyl)propyl]ethylenediamine, [3-(methacryloyloxy)propyl]trimethoxysilane, [3-(2-aminoethyl)aminopropyl]trimethoxysilane and [3-(methacryloyloxy)propyl]triethoxysilane. These silane additives can be purchased commercially, such KH470 (Nanjing Shuguang Company), KH560 (Nanjing Shuguang Company), KBM603 (Shin-Etsu Chemicals) or A1120 (Momentive Chemicals), etc.

In practical applications, the $A_xMO_y$ is preferably at least one compound selected from the group consisting of lithium vanadate ($LiVO_3$), permanganic acid ($HMnO_4$), sodium ferrate ($Na_2FeO_4$), lithium cobaltate ($LiCoO_2$), lithium nickelate ($LiNiO_2$), sodium yttrium oxide ($NaYO_2$) sodium zirconate ($Na_2ZrO_3$), lithium niobate ($LiNbO_3$), lithium molybdate ($Li_2MoO_4$), ruthenium acid ($H_2RuO_4$), lithium rhodate ($LiRhO_2$), lithium palladate ($Li_2PdO_3$), lithium tantalate ($LiTaO_3$), sodium tungstate ($Na_2WO_4$), rhenium acid ($H_2ReO_4$), potassium osmate ($K_2OsO_4$), potassium iridate ($KIrO_3$), sodium gallate ($NaGaO_2$), sodium indium oxide ($NaInO_2$), sodium stannate ($Na_2SnO_3$), sodium antimonate ($NaSbO_3$) and sodium bismuthate ($NaBiO_3$). These compounds provide a better effect to the coating liquid used for forming ultraviolet absorption coating.

Furthermore, the ultraviolet absorber is benzophenone ultraviolet absorbers, benzimidazole-based ultraviolet absorber or triazine-based ultraviolet absorber.

As a benzophenone ultraviolet absorber, it specifically includes 2,4-dihydroxy benzophenone, 2, 2', 3 (or 4, 5, 6)-trihydroxybenzophenone, 2,2',4,4'-tetrahydroxybenzophenone, 2,4-dihydroxy-2', 4'-dimethoxybenzophenone, 2-hydroxy-4-(octyloxy)benzophenone, etc.

As a benzimidazole ultraviolet absorber, it specifically includes 2-(2H-benzotriazol-2-yl)-4,6-bis(1-methyl-1-phenyl ethyl)phenol (UV absorber, commercial name is UV-234), 2-(5-chloro-2H-benzotriazole-2-yl)-4-methyl-6-(tert-butyl) phenol, octyl-3-[3-t-4-hydroxy-5-[5-chloro-2H-benzotriazol-2-yl] propionate, 2-(2H-benzotriazol-2-yl)-4,6-di-t-pentyl phenol, 2-(2-hydroxy-5-methylphenyl) benzotriazole, 2-[2-hydroxy-3-(3,4,5,6-tetrahydrophthalic imide-methyl)-5-methylphenyl] benzotriazole, 2-(2-hydroxy-5-t-octylphenyl) benzotriazole, 2-(2-hydroxy-5-t-butylphenyl)-2H-benzotriazole, methyl-3-(3-(2H-benzotriazol-2-yl)-5-tert-butyl-4-hydroxyphenyl) propionate, 2-(2H-benzotriazol-2-yl)-4,6-bis (1-methyl-1-phenyl ethyl) phenol, 2-(2H-benzotriazol-2-yl)-6-(1-methyl-1-phenyl ethyl)-4-(1,1,3,3-tetramethylbutyl) phenol, etc.

As a triazine ultraviolet absorber, it specifically includes 2-[4-[(2-hydroxy-3-dodecyloxypropyl) oxy]-2-hydroxyphenyl]-4,6-bis (2,4-dimethylphenyl)-1,3,5-triazine, 2-[4-[(2-hydroxy-3-(2'-ethyl) hexyl) oxy]-2-hydroxyphenyl]-4,6-bis (2,4-dimethylphenyl)-1,3,5-triazine, 2,4-bis (2-hydroxy-4-butoxyphenyl)-6-(2,4-bis-butoxyphenyl)-1,3,5-triazine, 2-(2-hydroxy-4-[1-octyl-carbethoxy] phenyl)-4,6-bis (4-phenylphenyl)-1,3,5-triazine, TINUVIN477 (commercial name, from Ciba Japan Company), etc.

The organic ultraviolet absorbers can absorb ultraviolet light of wide wavelength range. In the present invention, the ultraviolet absorbers may be used alone, or in a combination of two or more according to the actual need.

The coating liquid is applied on the glass substrate to form ultraviolet absorption coating, preparing ultraviolet absorption glass. As shown in FIG. 1, the ultraviolet absorption glass comprises glass and ultraviolet absorption coating 2, where the ultraviolet absorption coating 2 is arranged on at least one surface of the glass substrate 1. The ultraviolet absorption coating 2 containing silicon dioxide ($SiO_2$) and ultraviolet absorber further comprises MOz used for storing and releasing electrons that excited by ultraviolet lights in the ultraviolet absorber, wherein O is oxygen, M is at least one element selected from the group consisting of vanadium (V), manganese (Mn), iron (Fe), cobalt (Co), nickel (Ni), yttrium (Y), zirconium (Zr), niobium (Nb), molybdenum (Mo), ruthenium (Ru), rhodium (Rh), palladium (Pd), tantalum (Ta), tungsten (W), rhenium (Re), osmium (Os), iridium (Ir), gallium (Ga), indium (In), stannum (Sn), antimony (Sb) and bismuth (Bi), O is oxygen, and z is in a range of $1 \leq z \leq 4$.

In the process where the ultraviolet absorber absorbs the UV light, the ultraviolet absorber produces excited electrons and the excited electrons are gradually stored in MOz ($1 \leq z \leq 4$). The reaction equation (1) occurs:

$$MOz + ne^- + nA^+ \rightarrow AnMOz \quad (1),$$

where O is oxygen, A is hydrogen or alkali metal, M is at least one element selected from the group consisting of vanadium (V), manganese (Mn), iron (Fe), cobalt (Co), nickel (Ni), yttrium (Y), zirconium (Zr), niobium (Nb), molybdenum (Mo), ruthenium (Ru), rhodium (Rh), palladium (Pd), tantalum (Ta), tungsten (W), rhenium (Re), osmium (Os), iridium (Ir), gallium (Ga), indium (in), stannum (Sn), antimony (Sb) and bismuth (Bi), z is in a range of $1 \leq z \leq 4$, n is in a range of $1 \leq n \leq 2$.

When there is no ultraviolet light, that is, the ultraviolet absorber coating does not absorb the ultraviolet light, and the excited electrons previously stored in MOz ($1 \leq z \leq 4$) are released. The reaction equation (2) occurs:

$$AnMOz \rightarrow MOz + ne^- + nA^+ \quad (2).$$

Equation (2) is deemed to be a reverse reaction of equation (1), where the notations are consistent with that in equation (1). Therefore, the notations will not be illustrated in detail herein.

At the same time, the electrons released in reaction (2) diffuse to the surface of ultraviolet absorption glass, being consumed by $O_2$ of the air adsorbed on the surface of the glass. The reaction equation (3) occurs:

$$O_2 + 2e^- \rightarrow 2O^- \quad (3)$$

It can be known from the reaction equation (1), (2) and (3) that when the ultraviolet absorption coating 2 arranged on ultraviolet absorption glass is exposed to the UV light, such as in a sunny day, MOz will absorb and store the excited electrons. When there is no UV light, such as at a dark night, MOz will gradually release the electrons previously absorbed and stored in the daytime. The process is equivalent to transferring the excited electrons, thus avoiding the electrons accumulating and destroying the silicon dioxide and ultraviolet absorber in the ultraviolet absorption coating, not to cause discoloration or devitrification to ultraviolet absorption coating and ultraviolet absorption glass.

In practical applications, the MOz is at least one compound selected from the group consisting of vanadium pentoxide ($VO_{5/2}$), manganese dioxide ($MnO_2$), iron(III) oxide ($FeO_{3/2}$), cobalt oxide (II,III) ($CoO_{4/3}$), nickel(II) oxide (NiO), yttrium(III) oxide ($YO_{3/2}$), zirconium dioxide ($ZrO_2$), niobium pentoxide ($NbO_{5/2}$), molybdenum(VI) oxide ($MoO_3$), ruthenium dioxide ($RuO_2$), rhodium(III) oxide ($RhO_{3/2}$), palladium(II) oxide (PdO), tantalum pentoxide ($TaO_{5/2}$), tungsten(VI) oxide ($WO_3$), rhenium trioxide ($ReO_3$), osmium (VIII) oxide ($OsO_4$), iridium dioxide ($IrO_2$), gallium(III) oxide ($GaO_{3/2}$), indium (III) oxide ($InO_{3/2}$), tin(IV) oxide ($SnO_2$), antimony pentoxide ($SbO_{5/2}$) and bismuth pentoxide ($BiO_{5/2}$). These compounds provide a better effect to the ultraviolet absorption glass arranged with the coating.

The MOz listed above will reduce color difference $\Delta E^*ab$ between the ultraviolet absorption glass and the glass substrate 1. For example, using white float glass or green float glass as the glass substrate 1 will achieve a color difference $\Delta E^*ab$ between the ultraviolet absorption glass and the glass substrate 1 under 2.0 ($\Delta E^*ab \leq 2.0$). In accordance with practice, vanadium pentoxide ($VO_{5/2}$), iron(III) oxide ($FeO_{3/2}$), cobalt oxide ($CoO_{4/3}$), yttrium(III) oxide ($YO_{3/2}$), niobium pentoxide ($NbO_{5/2}$), rhodium(III) oxide ($RhO_{3/2}$), tantalum pentoxide ($TaO_{5/2}$), gallium(III) oxide ($GaO_{3/2}$), indium (III) oxide ($InO_{3/2}$), antimony pentoxide ($SbO_{5/2}$) and bismuth pentoxide ($BiO_{5/2}$) are written as $V_2O_5$, $Fe_2O_3$, $Co_3O_4$, $Y_2O_3$, $Nb_2O_5$, $Rh_2O_3$, $Ta_2O_5$, $Ga_2O_3$, $In_2O_3$, $Sb_2O_5$ and $Bi_2O_5$, being consistent with the form of MOz without changing its actual meaning.

Furthermore, the ultraviolet absorber is benzophenone ultraviolet absorber, benzimidazole ultraviolet absorber or triazine ultraviolet absorber.

As a benzophenone ultraviolet absorber, it specifically includes 2,4-dihydroxy benzophenone, 2, 2', 3 (or 4/5/6)-trihydroxybenzophenone, 2,2',4,4'-tetrahydroxybenzophenone, 2,4-dihydroxy-2', 4'-dimethoxybenzophenone, 2-hydroxy-4-(octyloxy)benzophenone, etc.

As a benzimidazole ultraviolet absorber, it specifically includes 2-(2H-benzotriazol-2-yl)-4,6-bis(1-methyl-1-phenyl ethyl)phenol (UV absorber, commercial name is UV-234), 2-(5-chloro (2H)-benzotriazole-2-yl)-4-methyl-6-(tert-butyl) phenol, octyl-3-[3-t-4-hydroxy-5-[5-chloro-2H-benzotriazol-2-yl] propionate, 2-(2H-benzotriazol-2-yl)-4,6-di-t-pentyl phenol, 2-(2-hydroxy-5-methylphenyl) benzotriazole, 2-[2-hydroxy-3-(3,4,5,6-tetrahydrophthalic imide-methyl)-5-methylphenyl] benzotriazole, 2-(2-hydroxy-5-t-octylphenyl) benzotriazole, 2-(2-hydroxy-5-t-butylphenyl)-2H-benzotriazole, methyl-3-(3-(2H-benzotriazol-2-yl)-5-tert-butyl-4-hydroxyphenyl) propionate, 2-(2H-benzotriazol-2-yl)-4,6-bis (1-methyl-1-phenylethyl) phenol, 2-(2H-benzotriazol-2-yl)-6-(1-methyl-1-phenylethyl)-4-(1,1,3,3-tetramethylbutyl) phenol, etc.

As a triazine ultraviolet absorber, it specifically includes 2-[4-[(2-hydroxy-3-dodecyloxypropyl) oxy]-2-hydroxyphenyl]-4,6-bis (2,4-dimethylphenyl)-1,3,5-triazine, 2-[4-[(2-hydroxy-3-(2'-ethyl) hexyl) oxy]-2-hydroxyphenyl]-4,6-bis (2,4-dimethylphenyl)-1,3,5-triazine, 2,4-bis (2-hydroxy-4-butoxyphenyl)-6-(2,4-bis-butoxyphenyl)-1,3,5-triazine, 2-(2-hydroxy-4-[1-octyl-carbethoxy] phenyl)-4,6-bis (4-phenylphenyl)-1,3,5-triazine, TINUVIN477 (commercial name, from Ciba Japan Company), etc.

The organic ultraviolet absorbers can absorb ultraviolet light of wide wavelength range. In the present invention, the ultraviolet absorbers may be used alone, or in a combination of two or more according to the actual need.

In the present invention, silicon dioxide is used for improving hardness and adhesion to the glass substrate 1 of the ultraviolet absorption coating 2 which is formed by the coating liquid, thereby ensuring high durability of the ultraviolet absorption coating 2. Preferably, in an ultraviolet absorption coating 2, a molar ratio of MOz to silicon dioxide is in a range of 1/300-1/100. More preferably, in the ultraviolet absorption coating 2, a molar ratio of MOz to silicon dioxide is in a range of 1/180-1/120.

In the present invention, an ultraviolet absorber absorbs ultraviolet light and blocks the UV light coming into the vehicle or the house, avoiding damage to people and aging of the decoration. Preferably, in an ultraviolet absorption coating, a molar ratio of MOz to ultraviolet absorber is in a range of 1/20-1/10. More preferably, in the ultraviolet absorption coating 2, a molar ratio of MOz to silicon dioxide is in a range of 1/18-1/12.

A coating liquid used for forming an ultraviolet absorption coating and an ultraviolet absorption glass arranged with the ultraviolet absorption coating are described above in detail. Furthermore, the present invention provides a method for preparing the ultraviolet absorption glass, comprising the following steps.

Step 1: providing silane compound and AxMOy as raw material, providing deionized water and at least one alcohol as a solvent, stirring and ultrasonically dispersing the raw material and solvent, wherein A is hydrogen or an alkali metal, O is oxygen, M is at least one element selected from the group consisting of vanadium (V), manganese (Mn), iron (Fe), cobalt (Co), nickel (Ni), yttrium (Y), zirconium (Zr), niobium (Nb), molybdenum (Mo), ruthenium (Ru), rhodium (Rh), palladium (Pd), tantalum (Ta), tungsten (W), rhenium (Re), osmium (Os), iridium (Ir), gallium (Ga), indium (In), tin (Sn), antimony (Sb) and bismuth (Bi), x is in a range of $1 \leq x \leq 2$, y is in a range of $1 \leq y \leq 4$.

The silane compound is at least one compound selected from but not limited to the group consisting of tetramethoxysilane, tetraethoxysilane, trimethoxysilane, triethoxysilane and dimethoxydimethylsilane. Any other colloid substance that produces partially hydrolyzed condensate via hydrolysis or a series of reaction can be selected.

As a solvent, the alcohol may be but not limited to ethanol and isopropanol, other alcohols can also be selected according to actual need.

AxMOy is preferably at least one compound selected from the group consisting of lithium vanadate ($LiVO_3$), permanganic acid ($HMnO_4$), sodium ferrate ($Na_2FeO_4$), lithium cobaltate ($LiCoO_2$), lithium nickelate ($LiNiO_2$), sodium yttrium oxide ($NaYO_2$), sodium zirconate ($Na_2ZrO_3$), lithium niobate ($LiNbO_3$), lithium molybdate ($Li_2MoO_4$), ruthenium acid ($H_2RuO_4$), lithium rhodate ($LiRhO_2$), lithium palladate ($Li_2PdO_3$), lithium tantalate ($LiTaO_3$), sodium tungstate ($Na_2WO_4$), rhenium acid ($H_2ReO_4$), potassium osmate ($K_2OsO_4$), potassium iridate ($KIrO_3$), sodium gallate ($NaGaO_2$), sodium indium oxide ($NaInO_2$), sodium stannate ($Na_2SnO_3$), sodium antimonate ($NaSbO_3$) and sodium bismuthate ($NaBiO_3$).

Step 2: after the step of stirring and ultrasonically dispersing, conducting a hydrolysis reaction and a condensation reaction between the raw material and solvent to produce a colloid B containing silicon dioxide in a form of a partially hydrolyzed condensate.

As a matrix of the final ultraviolet absorption coating, silicon dioxide improves hardness and adhesion to the glass substrate of the ultraviolet absorption coating which is formed by the coating liquid, thereby ensuring high durability of the ultraviolet absorption coating.

Step 3: adding an ultraviolet absorber and a silane additive to the colloid B while stirring to dissolve the ultraviolet absorber, then obtaining a coating liquid C used for forming an ultraviolet absorption coating.

The silane additive is at least one compound selected from the group consisting of N-[3-(trimethoxysilyl)propyl]ethylenediamine, [3-(methacryloyloxy)propyl]trimethoxysilane, [3-(2-aminoethyl)aminopropyl]trimethoxysilane and [3-(methacryloyloxy)propyl]triethoxysilane.

The ultraviolet absorber is benzophenone ultraviolet absorber, benzimidazole ultraviolet absorber or triazine ultraviolet absorber. These three ultraviolet absorbers have been described in detail in the above description, it is not further described herein.

Step 4: preparing a glass substrate, applying the coating liquid C uniformly on at least one surface of the glass substrate.

The glass substrate is preferably but not limited to a white float glass or a green float glass. Any glass sheet prepared by other methods that meet the requirements will be selected as the glass substrate of the present invention.

At the same time, the coating liquid C can be uniformly applied on the glass substrate in different ways, such as spraying, wiping, flow coating, brushing and dipping that optionally combines with ultrasound, centrifugation or rotation techniques. Since the coating technique is known in the art, it is not further described herein.

Step 5: drying the coating liquid C at a temperature of 100° C.–200° C. to form an ultraviolet absorption coating containing MOz on a surface of the glass substrate, O is oxygen, M is at least one element selected from the group consisting of vanadium (V), manganese (Mn), iron (Fe), cobalt (Co), Nickel (Ni), yttrium (Y), zirconium (Zr), niobium (Nb), molybdenum (Mo), ruthenium (Ru), rhodium (Rh), palladium (Pd), tantalum (Ta), tungsten (W), rhenium (Re), osmium (Os), iridium (Ir), gallium (Ga), indium (in), tin (Sn), antimony (Sb) and bismuth (Bi), z is in a range of $1 \leq z \leq 4$, thereby obtaining an ultraviolet absorption glass.

The MOz is at least one compound selected from the group consisting of vanadium pentoxide ($VO_{5/2}$), manganese dioxide ($MnO_2$), iron(III) oxide ($FeO_{3/2}$), cobalt oxide (II,III) ($CoO_{4/3}$), nickel(II) oxide (NiO), yttrium(III) oxide ($YO_{3/2}$), zirconium dioxide ($ZrO_2$), niobium pentoxide ($NbO_{5/2}$), molybdenum(VI) oxide ($MoO_3$), ruthenium dioxide ($RuO_2$), rhodium(III) oxide ($RhO_{3/2}$), palladium(II) oxide (PdO), tantalum pentoxide ($TaO_{5/2}$), tungsten(VI) oxide ($WO_3$), rhenium trioxide ($ReO_3$), osmium (VIII) oxide ($OsO_4$), iridium dioxide ($IrO_2$), gallium(III) oxide ($GaO_{3/2}$), indium (III) oxide ($InO_{3/2}$), tin(IV) oxide ($SnO_2$), antimony pentoxide ($SbO_{5/2}$) and bismuth pentoxide ($BiO_{5/2}$).

The step of drying the coating liquid C is conducted for 30 to 120 minutes. It is understood that the time for drying depends on the different coating liquid C, so that the time for drying is determined according to the actual conditions.

EXAMPLES

Further description of the present invention will be illustrated, which combined with embodiments. It will be understood that the embodiments are illustrative and that the invention scope is not so limited.

As the compounds MOz are similar in reaction mechanism, tungsten trioxide ($WO_3$) is used as an example to explain the present invention. Other MOz compounds will not be illustrated in detail herein.

Example 1

10 g of TEOS and 0.1 g of sodium tungstate ($Na_2WO_4$) were used as raw material, while ethanol, isopropanol and deionized water were used as solvent. The raw material and solvent were stirred and ultrasonically dispersed. After the step of stirring and ultrasonically dispersing, a hydrolysis reaction and a condensation reaction were conducted between the raw material and solvent to produce a colloid B containing silicon dioxide in a form of a partially hydrolyzed condensate. To 20 g of colloid B, 1.2 g of UV absorber 2,4-dihydroxy-2', 4'-dimethoxybenzophenone and 0.02 g of KH560 (purchased from Nanjing Shuguang Company) were added while stirring to dissolve the UV absorber. A stirring were continued for 2 hours to obtain a coating liquid C used for forming an ultraviolet absorption coating.

A white float glass (FUYAO 3.2C) was provided as a glass substrate. The white float glass has a thickness of 3.2 mm, a color of $L^*=95.67$, $a^*=-1.53$, $b^*=1.28$, a size of 150 mm×150 mm, and a UV-blocking rate of 31.67%. 2.3 g of the coating liquid C were uniformly applied on the surface of the glass substrate, and then dried at 150° C. for 1 hour to obtain an ultraviolet absorption glass arranged with the ultraviolet absorption coating, where a molar ratio of tungsten trioxide ($WO_3$) to silicon dioxide ($SiO_2$) is 1:158.7, a molar ratio of tungsten trioxide ($WO_3$) to the ultraviolet absorber is 1:16.1. The ultraviolet absorption glass was evaluated according to the performance evaluation method described below, and the evaluation results are shown in Table 1.

Performance Evaluation (1) UV-blocking rate: a transmission spectrum of a wavelength of 250 nm-2500 nm was generated by using a spectrophotometer (Mode: Perkin Elmer Lambda 950).

Lta was calculated according to ASTM E308-01 standard. Tuv and Te were calculated according to ISO9050-2003(E) standard. Tir was calculated according to TL957-2011 standard. Tuv was a calculated value of UV transmittance of a wavelength of 300 nm-380 nm. UV-blocking rate=100%−UV transmittance. UV transmittance was an average value calculated from 5 points of one sample.

(2) Color difference between ultraviolet absorption glass and glass substrate $\Delta E^*ab$: a transmission spectrum of a wavelength of 250 nm-2500 nm was generated by using a spectrophotometer (Mode: Perkin Elmer Lambda 950).

$L^*$, $a^*$ and $b^*$ were calculated according to CIE 1976 standard: average values of $L^*$, $a^*$ and $b^*$ calculated from 5 points of one glass substrate were denoted by $L^*1$, $a^*1$, $b^*1$, respectively; average value of $L^*$, $a^*$ and $b^*$ calculated from 5 points of one ultraviolet absorption glass were denoted by $L^*2$, $a^*2$, $b^*2$, respectively. Lightness difference, color difference and total color difference $\Delta E^*ab$ were given by Lightness difference: $\Delta a^*=L^*1-L^*2$ $\Delta a^*=a^*1-a^*2$ Color difference: $\Delta b^*=b^*1-b^*2$ Total color difference: $\Delta E^*ab=[(\Delta L^*)^2+(\Delta a^*)^2+(\Delta b^*)^2]^{1/2}$.

(3) Weather resistance test: the glass substrate and the ultraviolet absorption glass were simultaneously put into the xenon lamp aging test apparatus (Model: CI4000, United States) subjected to the weather resistance test under the following conditions: cycle: drying for 102 min and raining for 18 min; wavelength: 300-400 nm; radiation intensity: (60±2) w/m², black board temperature: (65±3)° C., tank temperature: (38±3)° C., relative humidity: (50±10)%, testing time: 1000 hours. After the weather resistance test, the samples were evaluated by step (1) and (2), UV-blocking rate and color difference $\Delta E^*ab$ between the ultraviolet absorption glass and the glass substrate were calculated.

Example 2

A green float glass (FUYAO 3.2G) was provided as a glass substrate. The green float glass has a thickness of 3.2 mm, a color of $L^*=93.02$, $a^*=-4.57$, $b^*=1.62$, a size of 150 mm×150 mm, and a UV-blocking rate of 59.11%. The glass substrate was treated in the same manner that of Example 1 to produce an ultraviolet absorption glass arranged with the ultraviolet absorption coating. The ultraviolet absorption glass was evaluated according to the performance evaluation method described in Example 1, and the evaluation results are shown in Table 1.

Example 3

A green float glass (FUYAO 3.2SG) was provided as a glass substrate. The green float glass has a thickness of 3.2 mm, a color of $L^*=89.47$, $a^*=-7.23$, $b^*=4.25$, a size of 150 mm×150 mm, and a UV-blocking rate of 76.49%. The glass substrate was treated in the same manner that of Example 1 to produce an ultraviolet absorption glass arranged with the ultraviolet absorption coating. The ultraviolet absorption glass was evaluated according to the performance evaluation method described in Example 1, and the evaluation results are shown in Table 1.

Example 4

A white float glass (FUYAO 3.2C) was provided as a glass substrate. The white float glass has a thickness of 3.2 mm, a color of $L^*=95.53$, $a^*=-1.13$, $b^*=0.18$, a size of 150 mm×150 mm, and a UV-blocking rate of 31.67%. In this embodiment, the glass substrate is treated without applying the ultraviolet absorption coating liquid of the present invention (deemed as a common glass). The common glass was evaluated according to the performance evaluation method described in Example 1, and the evaluation results are shown in Table 1.

Example 5

A green float glass (FUYAO 3.2G) was provided as a glass substrate. The green float glass has a thickness of 3.2 mm, a color of $L^*=92.98$, $a^*=-4.15$, $b^*=0.61$, a size of 150 mm×150 mm, and a UV-blocking rate of 59.11%. In this embodiment, the glass substrate is treated without applying the ultraviolet absorption coating liquid of the present invention (deemed as a common glass). The common glass was evaluated according to the performance evaluation method described in Example 1, and the evaluation results are shown in Table 1.

Example 6

A green float glass (FUYAO solar 3.2SG) was provided as a glass substrate. The green float glass has a thickness of 3.2 mm, a color of $L^*=89.33$, $a^*=-6.67$, $b^*=3.16$, a size of 150 mm×150 mm, and a UV-blocking rate of 76.49%. In this embodiment, the glass substrate is treated without applying the ultraviolet absorption coating liquid of the present invention (deemed as a common glass). The common glass was evaluated according to the performance evaluation method described in Example 1, and the evaluation results are shown in Table 1.

TABLE 1

Performance evaluation results of the ultraviolet absorption glass of Example 1-6

|  |  | Example 1 | Example 2 | Example 3 | Example 4 | Example 5 | Example 6 |
|---|---|---|---|---|---|---|---|
| Before[1*] | Lta | 89.25% | 82.99% | 75.24% | 88.86% | 82.86% | 74.89% |
|  | Tuv | 0.15% | 0.55% | 0.28% | 68.33% | 40.89% | 23.51% |
|  | Te | 79.06% | 60.68% | 47.46% | 81.93% | 62.84% | 48.85% |
|  | Tir | 77.23% | 47.36% | 30.02% | 76.59% | 47.16% | 29.83% |
|  | L* | 95.67 | 93.02 | 89.47 | 95.53 | 92.98 | 89.33 |
|  | a* | −1.53 | −4.57 | −7.23 | −1.13 | −4.15 | −6.77 |
|  | b* | 1.28 | 1.62 | 4.25 | 0.18 | 0.61 | 3.16 |
|  | UV-blocking rate | 99.85% | 99.45% | 99.72% | 31.67% | 59.11% | 76.49% |
|  | decision | ○ | ○ | ○ | X | X | X |
|  | ΔE*ab | 1.18 | 1.09 | 1.19 | — | — | — |
|  | decision | ○ | ○ | ○ | — | — | — |
| After[2*] | UV-blocking rate | 99.83% | 99.45% | 99.70% | 31.68% | 59.10% | 76.49% |
|  | decision | ○ | ○ | ○ | X | X | X |
|  | ΔE*ab | 1.22 | 1.11 | 1.24 | 0.01 | 0.02 | 0.02 |
|  | decision | ○ | ○ | ○ | ○ | ○ | ○ |

Note:
Before[1*]: before weather resistance test;
After[2*]: after weather resistance test.

In the above table, Lta is visible light transmittance of a wavelength of 380 nm-780 nm. Tuv is UV transmittance of a wavelength of 300 nm-380 nm. Te is total solar energy transmittance of a wavelength of 300 nm-2500 nm. Tir is infrared ray transmittance of a wavelength of 780 nm-2500 nm. UV-blocking rate=100%−UV transmittance, i.e. UV-blocking rate=100%−Tuv. The notation "o" represents "pass", the notation "x" represents "fail", and the notation "Δ" represents approach to a boundary value.

It can be seen from table 1 that the coating liquid used for forming ultraviolet absorption coating of the present invention can be used for various glass substrates, such as white float glass, green float glass, etc. An ultraviolet absorption coating forms on the surface of the glass substrate to bring a better UV-blocking rate and weather resistance to ultraviolet absorption glass.

Example 7

10 g of TEOS and 0.099 g of sodium tungstate ($Na_2WO_4$) were used as raw material, while ethanol, isopropanol and deionized water were used as solvent. The raw material and solvent were stirred and ultrasonically dispersed. After the step of stirring and ultrasonically dispersing, a hydrolysis reaction and a condensation reaction were conducted between the raw material and solvent to produce a colloid B containing silicon dioxide in a form of partially hydrolyzed condensate. To 20 g of colloid B, 1.201 g of UV absorber 2,4-dihydroxy-2', 4'-dimethoxybenzophenone and 0.02 g of KH560 (purchased from Nanjing Shuguang Company) were added while stirring to dissolve the UV absorber. A stirring were continued for 2 hours to obtain a coating liquid C used for forming an ultraviolet absorption coating.

A green float glass (FUYAO 3.2G) was provided as a glass substrate. The green float glass has a thickness of 3.2 mm, a size of 150 mm×150 mm, and a UV-blocking rate of 59.11%. 2.3 g of the coating liquid C were uniformly applied on the surface of the glass substrate, and then dried at 150° C. for 1 hour to obtain an ultraviolet absorption glass arranged with the ultraviolet absorption coating, where a molar ratio of tungsten trioxide ($WO_3$) to silicon dioxide ($SiO_2$) is 1; 158.6, a molar ratio of tungsten trioxide ($WO_3$) to the ultraviolet absorber is 1:16.1. The ultraviolet absorption glass was evaluated according to the performance evaluation method described in Example 1, and the evaluation results are shown in Table 2.

Example 8

The embodiment was prepared in the manner similar to that of Example 7, except that the sodium tungstate ($Na_2WO_4$) was added in an amount sufficient to adjust the molar ratio of tungsten trioxide ($WO_3$) to silicon dioxide ($SiO_2$) to a value of 1:350. An ultraviolet absorption glass arranged with the ultraviolet absorption coating was obtained. The ultraviolet absorption glass was evaluated according to the performance evaluation method described in Example 1, and the evaluation results are shown in Table 2.

Example 9

The embodiment was prepared in the manner similar to that of Example 7, except that the sodium tungstate ($Na_2WO_4$) was added in an amount sufficient to adjust the molar ratio of tungsten trioxide ($WO_3$) to silicon dioxide ($SiO_2$) to a value of 1:300. An ultraviolet absorption glass arranged with the ultraviolet absorption coating was obtained. The ultraviolet absorption glass was evaluated according to the performance evaluation method described in Example 1, and the evaluation results are shown in Table 2.

Example 10

The embodiment was prepared in the manner similar to that of Example 7, except that the sodium tungstate ($Na_2WO_4$) was added in an amount sufficient to adjust the molar ratio of tungsten trioxide ($WO_3$) to silicon dioxide ($SiO_2$) to a value of 1:180. An ultraviolet absorption glass arranged with the ultraviolet absorption coating was obtained. The ultraviolet absorption glass was evaluated according to the performance evaluation method described in Example 1, and the evaluation results are shown in Table 2.

Example 11

The embodiment was prepared in the manner similar to that of Example 7, except that the sodium tungstate ($Na_2WO_4$) was added in an amount sufficient to adjust the molar ratio of tungsten trioxide ($WO_3$) to silicon dioxide ($SiO_2$) to a value of 1:120. An ultraviolet absorption glass arranged with the ultraviolet absorption coating was obtained. The ultraviolet absorption glass was evaluated according to the performance evaluation method described in Example 1, and the evaluation results are shown in Table 2.

Example 12

The embodiment was prepared in the manner similar to that of Example 7, except that the sodium tungstate ($Na_2WO_4$) was added in an amount sufficient to adjust the molar ratio of tungsten trioxide ($WO_3$) to silicon dioxide ($SiO_2$) to a value of 1:100. An ultraviolet absorption glass arranged with the ultraviolet absorption coating was obtained. The ultraviolet absorption glass was evaluated according to the performance evaluation method described in Example 1, and the evaluation results are shown in Table 2.

Example 13

The embodiment was prepared in the manner similar to that of Example 7, except that the sodium tungstate ($Na_2WO_4$) was added in an amount sufficient to adjust the molar ratio of tungsten trioxide ($WO_3$) to silicon dioxide ($SiO_2$) to a value of 1:80. An ultraviolet absorption glass arranged with the ultraviolet absorption coating was obtained. The ultraviolet absorption glass was evaluated according to the performance evaluation method described in Example 1, and the evaluation results are shown in Table 2.

Example 14

The embodiment was prepared in the manner similar to that of Example 7, except that the ultraviolet absorber was added in an amount sufficient to adjust the molar ratio of tungsten trioxide ($WO_3$) to ultraviolet absorber to a value of 1:25. An ultraviolet absorption glass arranged with the ultraviolet absorption coating was obtained. The ultraviolet absorption glass was evaluated according to the performance evaluation method described in Example 1, and the evaluation results are shown in Table 2.

Example 15

The embodiment was prepared in the manner similar to that of Example 7, except that the ultraviolet absorber was added in an amount sufficient to adjust the molar ratio of tungsten trioxide ($WO_3$) to ultraviolet absorber to a value of 1:20. An ultraviolet absorption glass arranged with the ultraviolet absorption coating was obtained. The ultraviolet absorption glass was evaluated according to the performance evaluation method described in Example 1, and the evaluation results are shown in Table 2.

Example 16

The embodiment was prepared in the manner similar to that of Example 7, except that the ultraviolet absorber was added in an amount sufficient to adjust the molar ratio of tungsten trioxide ($WO_3$) to ultraviolet absorber to a value of 1:18. An ultraviolet absorption glass arranged with the ultraviolet absorption coating was obtained. The ultraviolet absorption glass was evaluated according to the performance evaluation method described in Example 1, and the evaluation results are shown in Table 2.

Example 17

The embodiment was prepared in the manner similar to that of Example 7, except that the ultraviolet absorber was added in an amount sufficient to adjust the molar ratio of tungsten trioxide ($WO_3$) to ultraviolet absorber to a value of 1:12. An ultraviolet absorption glass arranged with the ultraviolet absorption coating was obtained. The ultraviolet absorption glass was evaluated according to the performance evaluation method described in Example 1, and the evaluation results are shown in Table 2.

Example 18

The embodiment was prepared in the manner similar to that of Example 7, except that the ultraviolet absorber was added in an amount sufficient to adjust the molar ratio of tungsten trioxide ($WO_3$) to ultraviolet absorber to a value of 1:10. An ultraviolet absorption glass arranged with the ultraviolet absorption coating was obtained. The ultraviolet absorption glass was evaluated according to the performance evaluation method described in Example 1, and the evaluation results are shown in Table 2.

Example 19

The embodiment was prepared in the manner similar to that of Example 7, except that the ultraviolet absorber was added in an amount sufficient to adjust the molar ratio of tungsten trioxide ($WO_3$) to ultraviolet absorber to a value of 1:6. An ultraviolet absorption glass arranged with the ultraviolet absorption coating was obtained. The ultraviolet absorption glass was evaluated according to the performance evaluation method described in Example 1, and the evaluation results are shown in Table 2.

TABLE 2

Performance evaluation results of the ultraviolet absorption glass of Example 7-19

| | Before weather resistance test | | | | After weather resistance test | | | |
|---|---|---|---|---|---|---|---|---|
| | UV-blocking rate | decision | ΔE*ab | decision | UV-blocking rate | decision | ΔE*ab | decision |
| Example 7 | 99.44% | ○ | 1.1 | ○ | 99.38% | ○ | 1.12 | ○ |
| Example 8 | 99.49% | ○ | 0.75 | ○ | 98.11% | X | 5.77 | X |
| Example 9 | 99.40% | ○ | 0.77 | ○ | 99.03% | ○ | 1.39 | Δ |
| Example 10 | 99.43% | ○ | 0.80 | ○ | 99.19% | ○ | 1.16 | ○ |

TABLE 2-continued

Performance evaluation results of the ultraviolet absorption glass of Example 7-19

|  | Before weather resistance test | | | | After weather resistance test | | | |
|---|---|---|---|---|---|---|---|---|
|  | UV-blocking rate | decision | ΔE*ab | decision | UV-blocking rate | decision | ΔE*ab | decision |
| Example 11 | 99.56% | ○ | 1.14 | ○ | 99.56% | ○ | 1.21 | ○ |
| Example 12 | 99.48% | ○ | 1.18 | ○ | 99.47% | ○ | 1.36 | Δ |
| Example 13 | 99.44% | ○ | 2.12 | X | 99.42% | ○ | 3.14 | X |
| Example 14 | 99.81% | ○ | 0.87 | ○ | 99.43% | ○ | 2.10 | X |
| Example 15 | 99.75% | ○ | 0.80 | ○ | 99.50% | ○ | 1.39 | Δ |
| Example 16 | 99.72% | ○ | 0.81 | ○ | 99.50% | ○ | 1.17 | ○ |
| Example 17 | 99.22% | ○ | 0.77 | ○ | 99.00% | ○ | 1.10 | ○ |
| Example 18 | 99.10% | Δ | 0.77 | ○ | 99.02% | Δ | 0.97 | ○ |
| Example 19 | 98.13% | X | 0.72 | ○ | 97.91% | X | 0.93 | ○ |

Compared Example 7 with 8-13, it can be seen from table 2 that a molar ratio of $WO_3$ to silicon dioxide in a range of 1/300-1/100, preferably 1/180-1/120 will bring a better UV-blocking rate and weather resistance to ultraviolet absorption glass.

Compared Example 7 with 14-19, it can be seen from table 2 that a molar ratio of $WO_3$ to ultraviolet absorber in a range of 1/20-1/10, preferably 1/18-1/12 will bring a better UV-blocking rate and weather resistance to ultraviolet absorption glass.

Example 20

The embodiment was prepared in the manner similar to that of Example 7, except that sodium tungstate ($Na_2WO_4$) and the ultraviolet absorber were not added. A coating glass arranged with a coating was obtained. The coating glass was evaluated according to the performance evaluation method described in Example 1, and the evaluation results are shown in Table 3.

Example 21

The embodiment was prepared in the manner similar to that of Example 7, except that the ultraviolet absorber was not added. A coating glass arranged with a coating was obtained. The coating glass was evaluated according to the performance evaluation method described in Example 1, and the evaluation results are shown in Table 3.

TABLE 3

Performance evaluation results of the glass obtained from Example 20-21

|  | Lta | Tuv | Te | Tir | L* | a* | b* |
|---|---|---|---|---|---|---|---|
| Example 20 | 83.35% | 41.42% | 63.05% | 47.10% | 93.20 | −4.18 | 0.55 |
| Example 21 | 83.57% | 42.01% | 62.82% | 47.12% | 93.29 | −4.22 | 0.61 |

It can be seen from table 3 that a coating glass without adding sodium tungstate ($Na_2WO_4$) and ultraviolet absorber (i.e. the coating contains no $WO_3$ and ultraviolet absorber) has no UV-blocking and IR-blocking function. Similarly, the coating glass adding $Na_2WO_4$ without the ultraviolet absorber (i.e. the coating contains $WO_3$ but no ultraviolet absorber) has no UV-blocking and IR-blocking function. It indicates that the $WO_3$ blocks neither ultraviolet light nor infrared ray, but plays an important role in storing and releasing the electrons excited by the UV light in the ultraviolet absorber.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the scope of the present invention. Accordingly, the scope of the present invention is described by the appended claims and is supported by the foregoing description.

What is claimed is:

1. A coating liquid used for forming an ultraviolet absorption coating, comprising partially hydrolyzed condensates of a silane compound and an ultraviolet absorber, wherein the coating liquid further comprises $HMnO_4$, deionized water and at least one alcohol, and
   wherein the $HMnO_4$ produces $MnO_2$ in the ultraviolet absorption coating, and the $MnO_2$ is used for storing and releasing electrons excited by ultraviolet light in the ultraviolet absorber.

2. The coating liquid used for forming ultraviolet absorption coating according to claim 1, wherein the silane compound is at least one compound selected from the group consisting of tetramethoxysilane, tetraethoxysilane, trimethoxysilane, triethoxysilane and dimethoxydimethylsilane.

3. The coating liquid used for forming ultraviolet absorption coating according to claim 1, wherein the alcohol in the coating liquid is selected from ethanol and isopropanol.

4. The coating liquid used for forming ultraviolet absorption coating according to claim 1, wherein the coating liquid further comprises a silane additive, and the silane additive is at least one compound selected from the group consisting of [3-(methacryloyloxy) propyl]trimethoxysilane, [3-(2-aminoethyl) aminopropyl]trimethoxysilane and [3-(methacryloyloxy) propyl]triethoxysilane.

5. The coating liquid used for forming ultraviolet absorption coating according to claim 1, wherein the ultraviolet absorber is benzophenone ultraviolet absorber, benzimidazole ultraviolet absorber or triazine ultraviolet absorber.

* * * * *